United States Patent [19]
Vaniglia

[11] Patent Number: 5,454,897
[45] Date of Patent: Oct. 3, 1995

[54] PRESSER MEMBER FOR FIBER LAYING MACHINE

[75] Inventor: Milo M. Vaniglia, Alexandria, Ky.

[73] Assignee: Cincinnati Milacron Inc., Cincinnati, Ohio

[21] Appl. No.: 235,991

[22] Filed: May 2, 1994

[51] Int. Cl.⁶ .................................................. B32B 31/00
[52] U.S. Cl. ........................... 156/166; 156/574; 156/577
[58] Field of Search ................................... 156/574, 523, 156/361, 166, 172, 577

[56] References Cited

U.S. PATENT DOCUMENTS

| | | | |
|---|---|---|---|
| 2,464,020 | 3/1949 | Breth | 154/9 |
| 2,838,091 | 6/1958 | Kraft | 154/9 |
| 4,052,246 | 10/1977 | Albareda et al. | 156/412 |
| 4,292,108 | 9/1981 | Weiss et al. | 156/259 |
| 4,341,584 | 7/1982 | Czernichowsky | 156/412 |
| 4,601,775 | 7/1986 | Grone | 156/523 |
| 4,699,683 | 10/1987 | McCowin | 156/353 |
| 4,867,834 | 9/1989 | Alenskis et al. | 156/433 |
| 4,869,774 | 9/1989 | Wisbey | 156/523 |
| 4,915,771 | 4/1990 | O'Brien et al. | 156/574 |
| 4,954,204 | 9/1990 | Grimshaw | 156/361 |
| 4,997,510 | 3/1991 | Shinno et al. | 156/514 X |
| 5,015,326 | 5/1991 | Frank | 156/511 |
| 5,022,952 | 6/1991 | Vaniglia | 156/441 |
| 5,045,147 | 9/1991 | Benson et al. | 156/429 |
| 5,058,497 | 10/1991 | Bishop et al. | 100/155 |
| 5,072,359 | 12/1991 | Kneifel, II | 156/574 X |
| 5,110,395 | 5/1992 | Vaniglia | 156/353 |

FOREIGN PATENT DOCUMENTS

| | | | |
|---|---|---|---|
| 0491353 | 6/1992 | European Pat. Off. | B29C 53/62 |
| 0491354 | 6/1992 | European Pat. Off. | B29C 53/62 |
| 0493739 | 7/1992 | European Pat. Off. | B29C 53/62 |
| 2753272 | 5/1979 | Germany . | |

*Primary Examiner*—James Engel
*Attorney, Agent, or Firm*—Thomas M. Farrell; Donald Dunn

[57] ABSTRACT

A segmented presser member for laying fiber tows and producing composite plastic articles has a plurality of presser element disks. The disks, stacked side-by-side, are independently movable and biased against a work surface such as a mandrel or mold. An elastic band is provided on the rotary outer periphery of each disk. Each band is unconnected to elastic bands on adjacent disks. The disks and their respective bands are radially movable during the laydown and compaction of the fiber tows over the changing contour of the workpiece surface. The elastic band has a low friction face, such as, for example, a (TEFLON) film, for engaging the fiber tows.

24 Claims, 9 Drawing Sheets

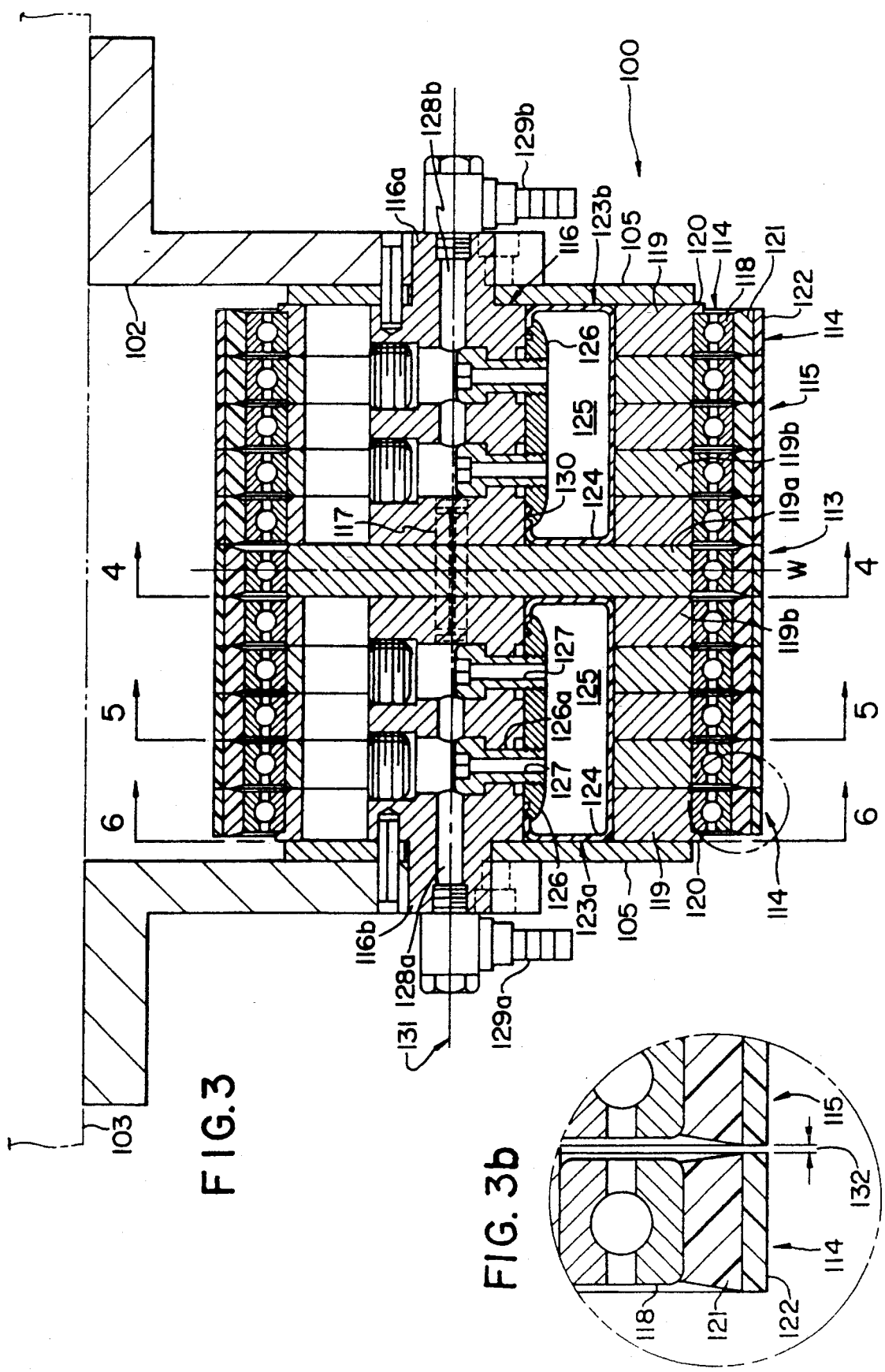

PRESSER MEMBER FOR FIBER LAYING MACHINE

FIELD OF THE INVENTION

This invention relates to fiber laying machines. More particularly this invention relates to segmented presser members employed in placing and compacting fiber tows onto a work surface or form.

BACKGROUND

Fiber tow laying machines and fiber tape laying machines are well known in the art and enjoy increasing usage to produce composite plastic parts, especially in aerospace applications, to replace comparable metallic parts. These composite plastic parts advantageously have a high strength to weight ratio, are producible in complex shapes that eliminate the need for several individual metallic parts, exhibit corrosion resistance and have other desirable physical properties (e.g., low electrical and heat conductivity). Various fiber tow laying machines and improvements thereto have been described in the literature of the art and the distinctions and advantages of these machines over filament winding and tape laying machines has been well documented (see for example U.S. Pat. No. 4,699,683 to McCowin and U.S. Pat. No. 5,022,952 to Vaniglia). Fiber tow laying machines can individually feed and cut separate fiber bundles or tows forming a fiber band being laid down on a work surface or form. This selective cutting and feeding of tows advantageously allows the fiber placement head to put down the tows in an arcuate path on the work surface that prevents buckling, wrinkling or misalignment of fibers. The fiber tows, also known as tow pregs, are generally a bundle of continuous fibers impregnated with a resin (i.e., a polymeric material that may be in a cured, uncured or partially cured state).

Many improvements have been made to fiber tow laying machines and fiber tape laying machines, and these improvements have been described in the literature of the composite plastics art, especially the patent literature. One of these improvements has been the segmented presser member assembly. The segmented presser member assembly generally has a series of side-by-side parallel arranged individual linearly movable presser elements that engage fiber tows to lay and compact the tows onto a work surface or form. The presser elements, which may be nonrotating or rotating elements, usually travel above and below a datum line. This improvement permits the presser member of the fiber tow laying and compacting head of a fiber tow laying machine to more easily and readily conform to changes in the contour of the work surface or form during the lay up procedure. Such segmented presser members, for fiber tow laying machines, have been described, for example, in U.S. Pat. No. 4,292,108 to A. E. Weiss et.al., U.S. Pat. No. 4,601,775 to R. J. Grone, U.S. Pat. No. 4,867,834 to B. A. Alenskis et.al., U.S. Pat. No. 4,869,774 to J. D. Wisbey, U.S. Pat. No. 5,015,326 to E. Frank, U.S. Pat. No. 5,045,147 to V. M. Benson et.al. and U.S. Pat. No. 5,110,395 to M. M. Vaniglia. The prior art segmented presser members commonly employ an elastic sleeve to cover and stretch across the fiber tow engaging faces of all the presser elements of the segmented presser member to form a continuous elastic or resilient fiber tow engaging surface for laying and compacting the fiber tows onto a work surface. This elastic sleeve is usually made of an elastomeric material such as elastomeric polyurethane. As the contour of the work surface changes during the lay up procedure the elastic sleeve would deform in response to the changing contour. This deformation of the sleeve is mirrored by linear movement of individual presser elements contacting the sleeve so that the presser member maintains contact with the work surface during changes in the surface contour. The segmented presser member and elastic sleeve combination improved the lay down and compaction of fiber tows onto a work surface because of the improved conformation of the presser member to changes in the work surface contour and improved contact of the presser member with the work surface.

Although improvements in the laydown and compaction of fiber tows onto a work surface are achieved with the combination of the segmented presser member and elastic sleeve, this combination produces other problems. One of the problems is the added spring force that the common sleeve induces on the presser elements as they are forced to move against the sleeve especially during compaction of the tows. This force varies in a spring-rate-like manner and increases as the presser elements move further away from the mid-travel datum line as in the case when laying down and compacting over a convex surface. Since the common sleeve induces a sleeve resistance on the presser elements as they move it is difficult to maintain a uniform pressure gradient across the compaction line as the presser member lays and compacts the fiber tows over a varying contour. The common sleeve effectively decreases the compaction force output capability of the presser elements thus causing the compaction line force to be nonlinear with presser element position. In the case of a presser member having compaction rollers moving with respect to a datum centerline, the sleeve resistance is unsymmetrical about the center line of the segmented presser member and increases with each presser element location moving away from the center line in either direction. A second problem is caused by the stretching or bulging of the common sleeve. As the presser elements move to conform to the changing contour of the work surface they induce a shearing-like force into the sleeve. This shear-like force causes the sleeve to bulge out and not maintain a tight fit to the presser element. The sleeve distortion or bulging may affect the incoming fiber tow feed path and tend to produce degraded lap/gap within the tow band, tow wander at end cuts and degraded end cut accuracy that may, in turn, lead to imperfections or defects in the composite plastic article and thus to unreliable and scrap articles, as well as increased costs and lower production.

SUMMARY OF THE INVENTION

It is an object of this invention to provide a fiber tow laying machine having a fiber tow laying and compacting head equipped with a segmented presser member which is compliant to adapt to changing contours across a lay up work surface while maintaining a substantially uniform compaction force across the entire compaction face of the presser member when compacting fiber tows onto a work surface.

Another object of this invention is to provide a segmented presser member that substantially maintains established fiber tow feed paths for laying fiber tows onto a work surface.

A further object of this invention is to provide a segmented presser member capable of substantially reducing overlap and gaps between fiber tows during the laydown of the tows onto a work surface.

These and other objects, as will become apparent from the accompanying description and drawings, are achieved in accordance with this invention in a fiber tow laying machine equipped a fiber tow laying and compacting head having a segmented presser member comprising a plurality of independently movable, parallel arrayed, side-by-side stacked presser elements, each element having an elastic band, on the fiber tow engaging portion of the element that is unconnected to adjacent elastic bands on adjacent presser elements. In this invention each presser element of the segmented presser member of the fiber tow laying and compaction head has an elastic band on the fiber tow engaging portion of the presser element that is independent of (i.e., is not connected to) the elastic bands on adjacent presser elements so as to exhibit independent action during the layup and compaction procedure for producing a fiber reinforced composite plastic article.

DESCRIPTION OF THE DRAWINGS

FIG. 3 is a view taken generally along line 3—3 of FIG. 2, in partial cross section, of the presser member of this invention.

FIG. 3b is an enlarged view of a portion of two adjacent presser elements showing a gap between the elastic bands of the elements.

DESCRIPTION OF INVENTION

Figure 1:
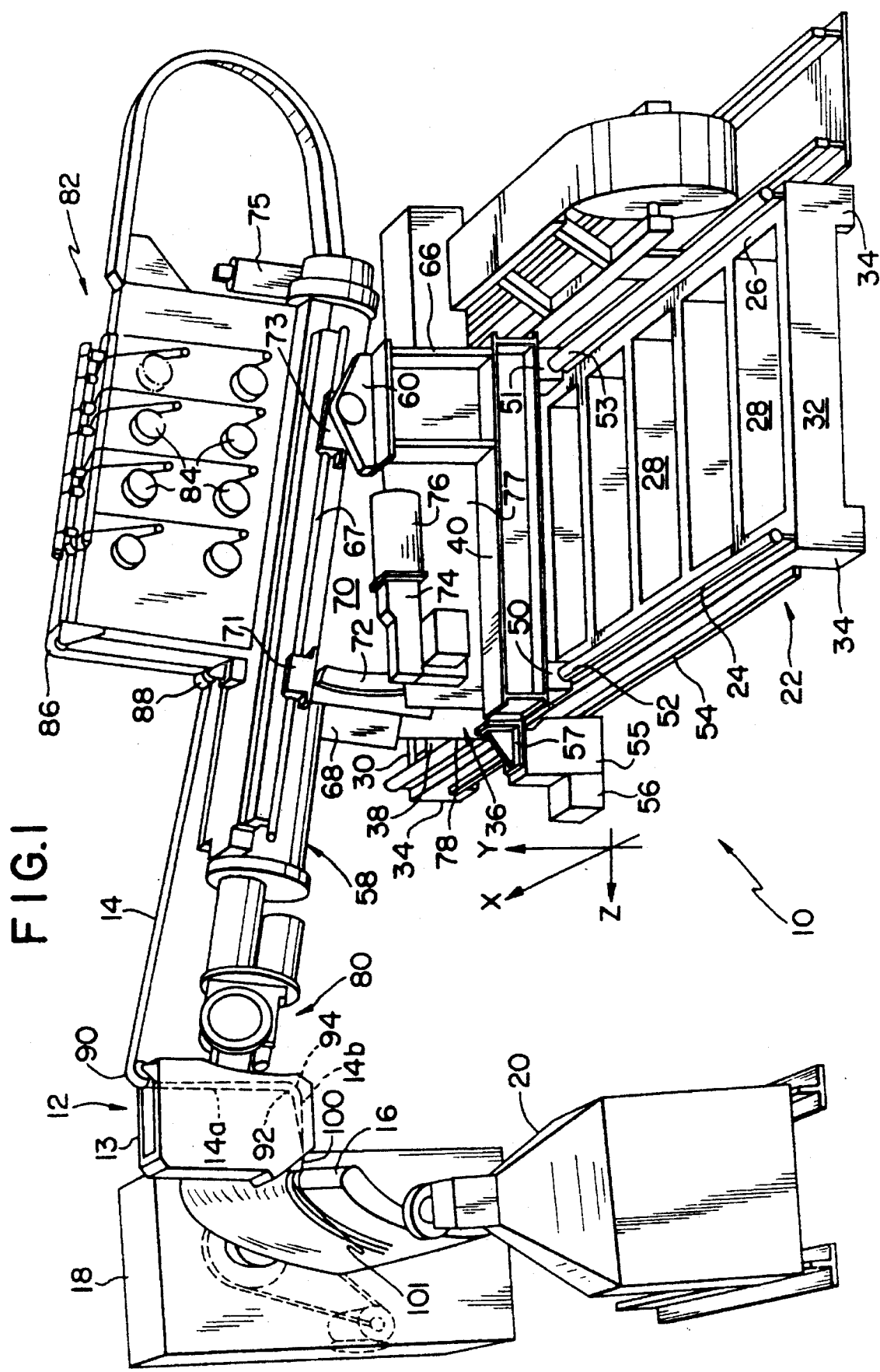
FIG. 1 is a schematic perspective view of a fiber placement machine employing a fiber placement head having a presser member of this invention.

There is provided in accordance with one aspect of this invention a segmented presser member assembly comprising a housing for carrying a segmented presser member and a segmented presser member comprising a plurality of parallel arrayed, side-by-side stacked presser elements wherein each presser element is independently movable linearly, has a rotatable fiber tow placing and pressing means thereon and has a fiber tow engaging elastic band on the rotatable fiber tow placing and pressing means. In this embodiment there is provided a segmented presser member assembly comprising a housing for carrying a segmented presser member and individual presser elements that are free to move linearly with changing contour of the workpiece surface (e.g., mandrel or mold) while a rotatable means on each element, having an elastic band thereon for engaging the fiber tows, is free to rotate during laying and compacting the fiber tow onto the workpiece surface. The segmented presser member of this embodiment thereby maintains contact with the workpiece surface during changes in the contour of that surface.

In another aspect of this invention there is provided a segmented presser member assembly comprising a housing for carrying a segmented presser member and a segmented presser member comprising a plurality of parallel arrayed, side-by-side stacked presser elements that are independently movable linearly and wherein each element has a nonrotatable fiber tow placing and pressing portion having an elastic band thereon that engages the fiber tow while laying and compacting the fiber tow onto a workpiece surface. The presser elements of this embodiment independently move linearly to adjust to changing contour of the workpiece surface while laying and compacting the fiber tow without rotary movement of the presser element. Such response to the changing contour of the workpiece surface maintains constant contact of the entire presser member fiber tow laying and compacting face with the workpiece surface and allows a uniform compaction force to be applied along the entire line of contact between the presser member and the workpiece surface.

In still a further aspect of this invention there is provided a segmented presser member assembly having a housing for carrying a segmented presser member and a segmented presser member comprising a center, linearly stationary presser element and at least one independently, linearly movable presser element on either side of the stationary element in side-by-side parallel array wherein each of the presser elements has a fiber tow engaging elastic band thereon for laying and compacting the tow onto a workpiece surface. In this embodiment there is provided a center presser element that does not move linearly with respect to the other presser elements of the segmented presser member. The presser elements of this embodiment may be of the nonrotating type wherein the presser elements do not have means that rotate during the laying and compaction of the fiber tow, or the presser elements may be of the rotating type wherein each element has a means or portion that rotates during the laying and compaction of the fiber tow.

In accordance with a further aspect of this invention there is provided a segmented presser assembly comprising a housing for carrying a segmented presser member, and a segmented presser member having on each rotatable means of each independently movable presser element of the presser member an elastic band having a low-friction film thereon as a fiber tow engaging face for laying and compacting the fiber tow onto a workpiece surface. This film exhibits low-friction against the fiber tow so as to lay and compact the fiber tow onto the workpiece surface without undesirable distortion and/or misalignment of the tow. Such low-friction film may be of a material similar to or different from the material of the elastic band. For example, a (TEFLON) a registered trademark of E.I. du Pont de Nemours and Company film may be attached to the elastic band to form a low-friction fiber tow engaging face or surface.

There may be employed in the practice of this invention, in conjunction with a nonrotatable, independently linearly movable presser element of the presser member having an elastic band thereon, and a low-friction film on the band as a fiber tow engaging face or surface for laying and compacting the fiber tow onto a workpiece surface. This film, which may be of a material similar to or different from the material of the elastic band, exhibits low-friction against the fiber tow so as to reduce or eliminate undesirable distortion and/or misalignment of the tow during the laying and compacting of the tow onto the surface of the workpiece. A low-friction material such as (TEFLON) may be used as the film.

The elastic band on the presser element of the presser member in accordance with this invention is made of a resilient material which can deform under applied pressure or force and return to its original undeformed state or shape and size upon removal of the applied pressure. Various materials may be used for the elastic band, particularly elastomeric polymeric materials. One such material is elastomeric polyurethane. The elasticity, resiliency or specifically the durometer of the elastic material used for the elastic band must be properly selected in accordance with the laying and compaction forces applied by the fiber tow laying machine during the production of a composite plastic article. The elastic band must have the proper resiliency to permit adaptation of the elastic band to local contours in the surface of the workpiece during the laying and compacting of the tow onto the workpiece surface, while at the same time exhibit sufficient rigidity to a) apply the desired compaction force to the tow on the workpiece surface, and b) reduce or prevent distortion and/or misalignment of the tow during the laying and compaction operations for producing the composite plastic article. Thus, the particular elastic characteristics of the material used to make the elastic band can vary with the operation parameters, particularly operation forces, of the fiber tow laying machine. The elastic band may be made of a low-friction, suitably resilient material that exhibits low-friction against the fiber tow and thereby provides a low-friction fiber tow engaging face or surface for laying and compacting the tow. Various methods may be employed to attach the elastic band to the presser element, including but not limited to, adhesive bonding and mechanical attachment.

In accordance with the practice of this invention there is provided on each presser element, of the segmented presser member, a fiber tow engaging elastic band for laying and compacting the tow onto a workpiece surface. Each elastic band is separated from adjacent elastic bands by a small gap, typically 0.005 inches (0.13 mm), allowing each elastic band to move and flex independently of adjacent elastic bands. The movement of these elastic bands provides additional independent adjustments for changes in the workpiece surface contour made by the independent linear movement of the presser elements. Thus, the independent elastic movement of the elastic bands and their individual contact with the workpiece surface, in combination with the independent linear movement of the presser elements, produces continuous contact with the workpiece surface and uniform compaction force across the entire contact zone between the segmented presser member and the surface of the workpiece during changes in the contour of the workpiece surface.

Prior art segmented presser members of fiber tow laying machines often employ an elastic sleeve or cover extending side-to-side continuously across all the presser segments to form a fiber tow engaging surface to lay and compact fiber tows onto a workpiece surface. This elastic sleeve is then mechanically held in place at each end of the array of presser segments of the presser member. As the presser member lays and compacts fiber tows onto the workpiece surface, the sleeve elastically adjusts to changes in the contour of the workpiece surface in conjunction with individual linear movement of the presser segments setting up a spring force through the sleeve extension when two adjacent presser segments are linearly displaced from each other relative to the workpiece surface, much like pulling on both ends of a rubber band. This spring force (i.e., sleeve or cover resistance), caused by the elasticity of the sleeve, increases with increasing linear displacement between adjacent presser segments during movement of the segmented presser member over the surface of the workpiece. Such sleeve or cover resistance acts on the presser segments in a direction opposite to the direction of the compaction force being applied by each presser segment and thus reduces the effective compaction force being applied by each presser segment in proportion to the sleeve resistance exerted on each segment. The result is a non-uniform compaction pressure across the zone of contact between the segmented presser member and the surface of the workpiece during the laying and compaction of the fiber tows. This non-uniform compaction pressure can lead to defects (e.g., delamination) in the composite plastic article produced with the fiber tow laying machine having a segmented presser member equipped with an elastic sleeve, as well as inaccurate tracking of the fiber tows on the workpiece surface. In some prior art segmented presser members of fiber tow laying machines it is known to use a bladder spring (i.e., a fluid pressurized elastic chamber) for applying compaction force to the elastic sleeve covered presser segments and hence to the fiber tows on the workpiece surface. The sleeve resistance acts opposite to the direction of the bladder spring compaction force to effectively locally reduce compaction force on fiber tows and create a non-uniform compaction pressure across the zone of contact between the segmented presser member and the workpiece surface.

The problems of sleeve resistance and sleeve bulge and their detrimental effect upon composite plastic articles produced with fiber tow laying machines having prior art segmented presser members equipped with an elastic sleeve continuously covering the presser segments do not occur in and are overcome by the segmented presser member of this invention and the fiber tow laying machine having the segmented presser member assembly according to this invention. The segmented presser member assembly of this invention has presser elements each having a separate elastic band that engages a fiber tow. Each of the separate elastic bands acts individually in response to changes in the contour of the workpiece surface during the layup and compaction of the fiber tows and thus does not produce sleeve resistance and/or sleeve bulge and the problems associated with such behavior.

This invention will now be further described with reference to the drawings and the preferred practice of the invention.

Referring now to FIG. 1, a perspective view of a fiber tow laying machine 10 is illustrated which mounts a fiber tow placement head 12, having a segmented presser member according to this invention, in a position to apply fiber tows 14 onto a mandrel 16 rotatably carried on a pair of mandrel supports 18, 20. As used herein, the term "tow" is meant to refer to a composite strand consisting of a number of continuous fibers preferably impregnated with a binder or matrix material such as epoxy resin. The detailed construction and operation of the fiber tow laying machine 10 and mandrel supports 18 and 20 form no part of this invention. Reference should be made to U.S. Pat. No. 5,022,952, of M. M. Vaniglia, assigned to the assignee of this application, for a detailed discussion of the fiber tow laying machine, the entire disclosure of which is incorporated herein by reference.

For purposes of the present discussion, the fiber tow laying machine 10 includes a base support 22 having substantially horizontally extending side rails 24,26 which are interconnected by longitudinally spaced support beams 28. The side rails 24,26 are connected at opposite ends to end panels 30,32, each of which is supported by relatively short vertical legs 34.

The base support 22 mounts a carriage 36 which comprises a pair of spaced beams 38,40 interconnected by rods (not shown). Each of the beams 38,40 has bearing blocks 50,51 at opposite ends which slidably engage ways 52,53 respectively mounted atop the side rails 24,26 of base support 22. Movement of the carriage 36 with respect to the base support 22 is effected by a rack and pinion drive. An elongated gear rack 54 is mounted to the underside of side rail 24 of base support 22 which is drivenly connected to a pinion (not shown) mounted to a gear box 55 and motor 56 connected by a support 57 to the carriage 36. Rotation of the pinion by operation of the motor 56 and gear box 55 causes the carriage 36 to move along the gear rack 54 parallel to the longitudinal axis of the base support 22, i.e., along the X axis as depicted in FIG. 1.

A cross slide 58 is pivotally mounted on opposite sides to a pair of bearings 60 each carried atop a vertical column 66, one of which is shown in FIG. 1. The vertical columns 66 in turn, are mounted atop the beams 38, 40. A pair of ways 67 are mounted to cross slide 58, one of which is shown in FIG. 1, which are carried by forward bushings 71 mounted to a tilt saddle having laterally spaced support plates 68,70. The rearward end of each way 67 is carried by a bushing 73 connected to each bearing 60. The forward end of each support plate 68,70 of the tilt saddle mounts an arcuate rack 72, one of which is shown in FIG. 1. Each arcuate rack 72 is drivenly connected to a pinion (not shown) connected to the output of a gear box 74 driven by a motor 76. A first gear box 74 and motor 76 pair is mounted to a side wall 77 connected to a beam 40, and a second gear box and motor pair (not shown) is mounted to a side wall 78 connected to beam 38. In response to operation of the motors 76 and gear boxes 74, the pinions drive arcuate racks 72 to pivot cross slide 58 on the bearings 60 in a substantially vertical direction, i.e., along a Y axis as depicted in FIG. 1. A separate drive (not shown) is also provided to move the cross slide 58 along a Z axis wherein the ways 67 are movable along the bushings 71, 73. Additionally, motor 75 fixed to the rear of the cross slide 58 is drivenly connected by means (not shown) to rotate the fiber laying head 12 about the Z axis.

One end of the cross slide 58 mounts a roll-bend-roll type robotics wrist 80 which carries the fiber laying head 12. The robotics wrist 80 is commercially available and is effective to move the fiber tow laying head 12 along a number of axes. Such motion provided by the robotics wrist 80 is in addition to the movement of cross slide 58 along the X axis with carriage 36, the pivotal and tilting movement of cross slide 58 along the Y axis and the cross feed movement of the cross slide 58 along the Z axis as described above. The fiber tow laying machine 10 is, therefore, capable of manipulating the position of the fiber tow laying head 12 along a number of axes with respect to the mandrel 16, and such motions are coordinated with the movement of the mandrel supports 18,20 by a controller (not shown) as discussed in detail in U.S. Pat. No. 5,022,952.

The operation of fiber tow laying machine 10 will now be further described with reference to FIGS. 1 and 2. The illustrated embodiment of the fiber tow laying machine 10 in FIG. 1 is effective to supply a total of sixteen individual fiber tows 14 to a fiber tow laying head 12 for application onto the surface of mandrel 16. The fiber tows 14 are supplied from a creel assembly 82 carried on the cross slide 58 which includes eight individual spools 84 on one side and another eight spools (not shown) on the opposite side, each of which supplies a single fiber tow 14. These tows 14 are drawn from spools 84 over a fixed roller 86 and a redirect roller 88, both mounted on the creel assembly 82, and a second redirect roller 90 mounted to the housing 13 of the fiber tow laying head 12. The purpose of the redirect rollers 88 and 90 is to maintain the same relative spatial orientation of the fiber tows 14 passing between the fiber laying head 12 and the creel assembly 82 as the fiber tow laying head 12 is manipulated with respect to the mandrel 16 and creel assembly 82. The structure and operation of redirect rollers 88,90 forms no part of this invention per se.

Eight fiber tows 14 are fed from the redirect roller 90 to an upper idler roller 92 (FIG. 2) rotatably mounted to the fiber tow laying head 12 and the other eight fiber tows 14 are directed from redirect roller 90 to a lower idler roller 94 mounted beneath the upper idler roller 92. The fixed roller 86, redirect rollers 88,90 and the upper and lower idler rollers 92,94 all include an individual roller for each tow 14; the individual rollers are mounted side-by-side and are rotatable relative to one another so that each tow 14 can be fed to the fiber tow laying head 12 at independent rates from the creel 82.

Fiber tows 14 are guided from the upper and lower idler rollers 92, 94 through a cooling assembly, a cut, clamp and restart mechanism and a guide chute to beneath segmented presser member 100 and hence onto the surface of mandrel 16 under segmented presser member 100. The eight fiber tows from the upper roller 92 are parallel and laterally spaced from one another forming upper tows 14a and the eight fiber tows from lower idler roller 94 are parallel and laterally spaced from one another forming lower tows 14b. The upper and lower tows 14a and 14b are staggered or offset from one another so that upon exiting the guide chute the upper and lower tows 14a and 14b are laid down side by side onto the surface of the mandrel 16 forming an essentially continuous-width fiber band 101 which is pressed against the mandrel 16 by segmented presser member 100. The cooling assembly, cut, clamp and restart mechanism and guide chute forming part of fiber tow laying head 12 form not part of this invention and their structure and operation are discussed and described in detail in U.S. Pat. No. 5,110,395 to M. M. Vaniglia, the entire disclosure of which is incorporated herein by reference.

Figure 2:
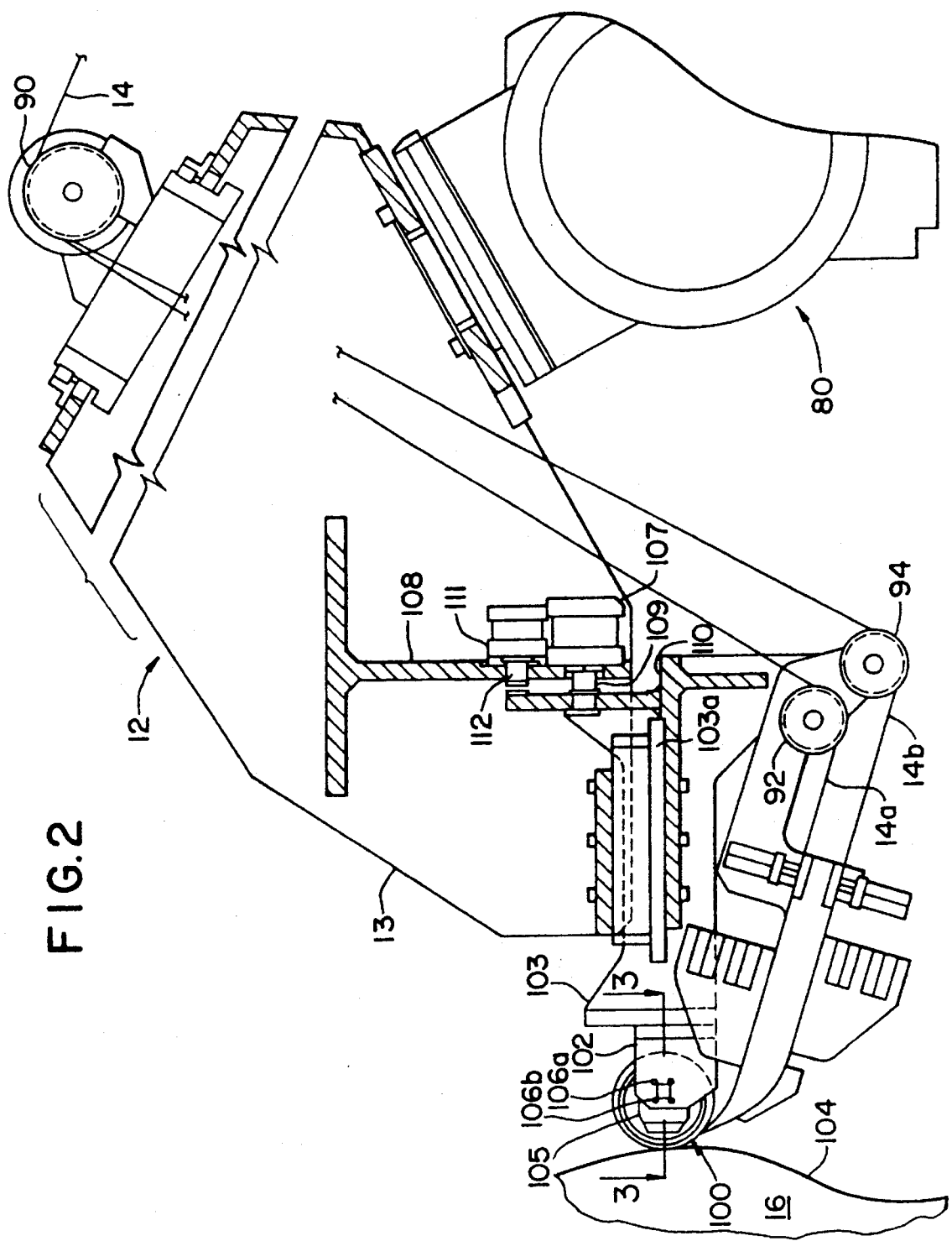
FIG. 2 is a side elevational view of the fiber placement head of FIG. 1.

Referring now to FIG. 2 there is shown the fiber tow laying head 12 having a segmented presser member 100, in accordance with this invention, for laying and compacting fiber tow 14 onto surface 104 of mandrel 16. The segmented presser member 100 is joined with a presser mount 102 and two side plates 105 (see FIG. 3) by screws 106a, 106b, and carried by an attached slider 103 for moving segmented presser member 100 into and from engagement with surface 104 of mandrel 16. A compaction fluid cylinder 107, preferably a double-acting pneumatic cylinder, is mounted on bracket 108 attached to housing 13 and has a piston 109 passing through bracket 108 and joined to bracket assembly 110 mounted on slider 103 that moves slider 103 linearly on a linear slide table 103a to bring segmented presser member 100 into and out of compaction engagement with surface 104 of mandrel 16 for compacting fiber tow 14. Cylinder 107 provides controlled compaction force on the fiber tow and sets the level of compaction force on the fiber tow applied to mandrel 16. A null fluid cylinder 111, preferably a pneumatic cylinder, mounted on bracket 108 has a piston 112 that engages bracket assembly 110 to hold segmented presser member 100, carried on slider 103 in a null position and zero compaction force engagement with surface 104 at the initiation of a fiber tow laying and compaction operation.

Figure 3A:
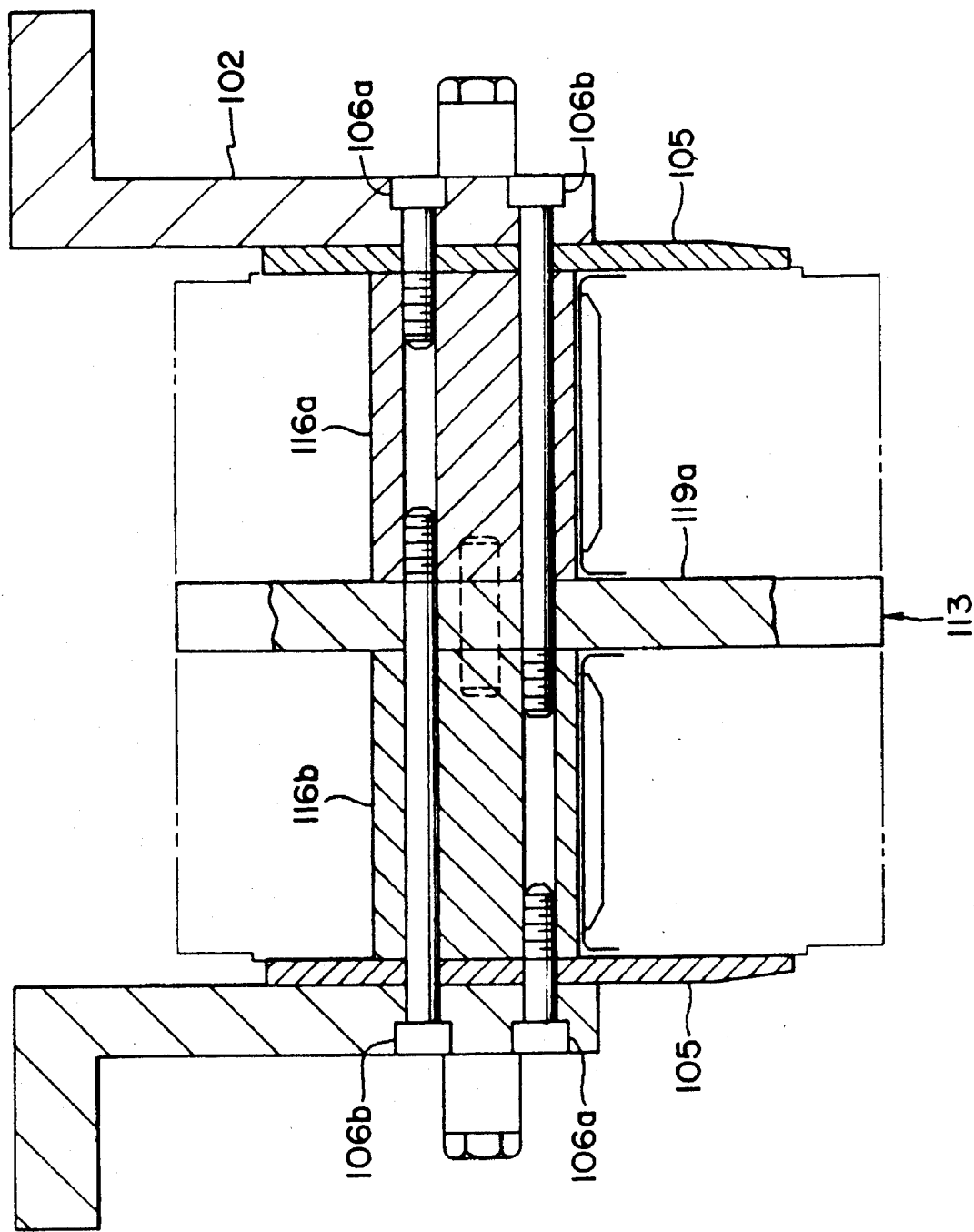
FIG. 3a is a view similar to FIG. 3, showing the screw arrangement for assembling the presser member.

The segmented presser member 100, in accordance with this invention, will now be described with reference to FIG. 3, a view, in partial section taken along line 3—3 of FIG. 2. A plurality of presser element disks having a center disk 113, a pair of end disks 114,114a and several identical intermediate disks 115 located between the center disk 113 and the end disks 114,114a are mounted on support block 116 between side plates 105 in a side-by-side stacked parallel array. Support block 116 is in two identical halves 116a,116b joined together by screws 106a, 106b passing through the center disk 113, each half 116a, 116b of support block 116, the side plates 105, and the presser mount 102 (see FIG. 3a). The presser mount 102 is, in turn, carried on the slider 103 (see FIG. 2). The center disk 113, mounted to support block 116 with two pins 117 (see FIG. 4), remains stationary with respect to linear movement along a path coincident with the center line W of the stacked array of disks. Intermediate disks 115 and end disks 114 are independently linearly movable on support block 116 in a path parallel to center line W with changes in the contour of the surface of mandrel 16. Each of the disks has a low friction ball bearing 118 mounted on the periphery of the respective core 119,119a, 119b, to provide rolling contact of the presser element disk with the surface 104 of mandrel 16 for laying and compacting fiber tows onto mandrel 16. The ball bearing 118 may be pressmounted onto the cores. The cores 119 of end disks 114 have a shoulder 120 that engages the ball bearing 118. An elastic band 121 is attached to the outer periphery of ball bearing 118 on each presser element disk 113,114,115 that rotates with the bearing 118 and moves linearly with the linear movement of the presser element disk, independent of the rotary and linear movements of elastic bands on adjacent presser element disks. Attached to and covering the outer periphery of each elastic band 121 is a low friction film ring 122 that forms the fiber tow engaging surface or face of each presser element disk 113,114,115 and which has the same rotary and linear movements as the elastic band 121 to which it is attached independent of the rotary and linear movement the low-friction film rings 122 attached to adjacent elastic bands 121 on adjacent presser element disks. The elastic band 121 is a resilient material that deforms and regains its original shape and size upon removing the force that produces deformation of the elastic band 121. Any suitable resilient material may be used for elastic band 121 including, but not limited to, elastomeric polymers; for example, elastomeric polyurethane. The low friction film ring 122 is of a material that exhibits low friction against the fiber tow. For example, the low friction film ring 122 may be made of (TEFLON).

There is provided in the segmented presser member 100 (shown in FIG. 3) two fluid pressure bladder springs 123a, 123b extending through the intermediate presser element disks 115 and the end presser element disks 114. These bladder springs 123a,123b apply fluid pressure to the movable presser element disks (i.e., the intermediate presser element disks 115 and end presser element disks 114) during the compaction of the fiber tows onto the mandrel 16. Each of the bladder springs 123a, 123b has an elastic membrane 124 enclosing a chamber 125 and is confined by the center presser element disk 113, the respective side plate 105, intermediate presser element disks 115, end presser element disks 114, and the support block 116. Clamping plates 126, retained by socket head cap screws 126a, clamp and seal the membranes 124 to the support block 116. Ports 127 through the cap screws 126a provide fluid communication between passageways 128a,b, and the respective chambers 125. Fluid passageways 128a,b in turn, connect to fluid supply inlets 129a,b. Preferably the fluid used to pressurize the bladder springs 123a,123b is compressed air. The clamping plates 126 have a lip 130 for engaging and holding elastic membrane 124 in place against support block 116. In operation, pressurized fluid (i.e., compressed air) is fed to the inlets 129a,b, through passageways 128a,b and ports 127 into chambers 125. As chamber 125 is pressurized, membrane 124 is forced against intermediate disks 115 and end disks 114 to move these disks toward the mandrel 16 and maintain contact of these presser element disks with the surface 104 of mandrel 16. The pressure of the compressed air is adjusted and maintained by a means (not shown) to provide constant contact of the presser element disks 114, 115 with surface 104 of mandrel 16.

Center disk 113, intermediate disks 115 and end disks 114 are spaced side-by-side so as to be close enough together to permit easy independent linear movement relative to each other. A gap 132 is provided between adjacent roller bearings 118, elastic bands 121 and low friction film rings 122, typically 0.005 inches (0.13 mm) (see FIG. 3b), sufficient to permit rotation and linear movement of the assembly of roller bearing 118, elastic band 121 and low friction ring 122 during the laying and compacting of fiber tows 14 onto mandrel 16.

The structure and operation of individual presser element disks of segmented presser member 100, in accordance with this invention, will now be further described with reference to FIGS. 4, 5, and 6 taken along lines 4—4, 5—5 and 6—6 respectively in FIG. 3.

Figure 4:
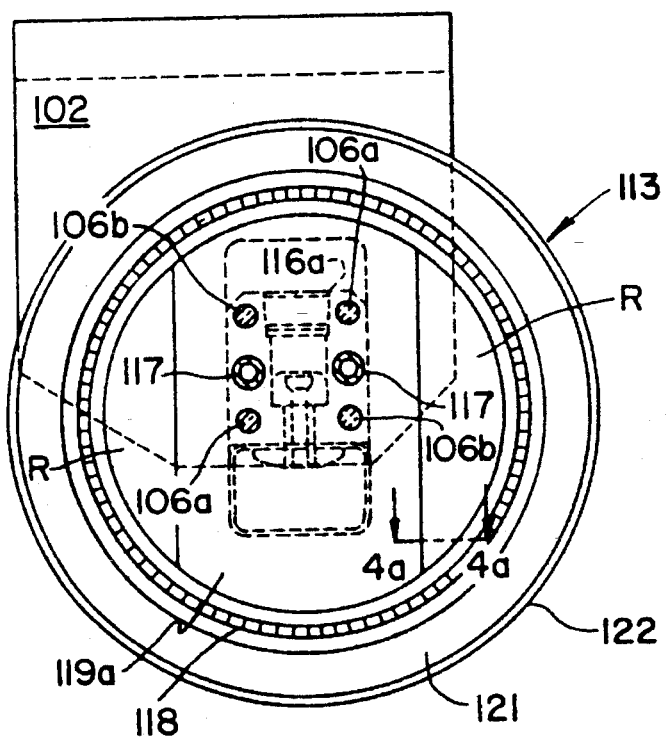
FIG. 4 is a view taken generally along line 4—4 of FIG. 3 of the center presser element of the presser member of this invention.

The center presser element disk 113 shown in FIG. 4 in side elevation with partial section, taken along line 4—4 of FIG. 3 is held stationary with respect to linear movement along a path coincident with center line W (FIG. 3) and perpendicular to a datum axis 131 by screws 106a, 106b and a pair of pins 117 passing through core 119a of center disk 113 into both halves 116a, 116b of support block 116. Ball bearing 118, having on its outer periphery elastic band 121 to which is attached low-friction film ring 122, provides rolling contact of center presser element disk 113 with fiber tow 14 during the laying and compaction of the tow 14 onto mandrel 16.

Figure 4A:
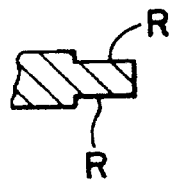
FIG. 4a is a sectional view, taken along the line 4a—4a of FIG. 4, showing typical facial reliefs formed into the cores of the presser element disks.

FIG. 4a illustrates shallow facial reliefs, R, which are formed into the sides of the cores of the presser element disks to reduce the sliding area.

Figure 5:
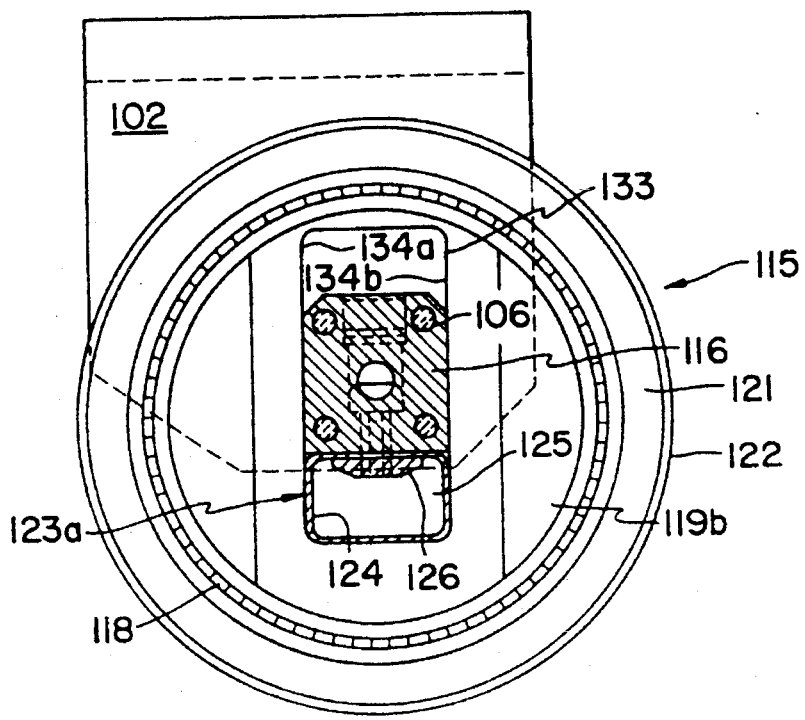
FIG. 5 is a view taken generally along line 5—5 of FIG. 3 of an intermediate presser element of the presser member of this invention.

Intermediate presser element disk 115, shown in FIG. 5 in side elevation with partial section, taken along line 5—5 of FIG. 3, is mounted on the support block 116, for linear movement along a path parallel to center line W (FIG. 3) and perpendicular to a datum axis 131 (FIG. 3), through a substantially rectangular opening 133 formed by side guide surfaces 134a,b in core 119b of intermediate presser element disk 115. The bladder spring 123a passes through the lower end of opening 133 so as to place the elastic membrane 124 of bladder spring 123*a* in contact with core 119*b* of intermediate disk 115, whereby the bladder spring 123*a*, upon being pressurized, can exert a force on intermediate disk 115 in a direction toward mandrel 16 causing intermediate disk 115 to apply compaction pressure or force on fiber tow 14 on surface 104 of mandrel 16. Free space is provided at the upper end of opening 133 to permit the linear movement of intermediate disk 115 with changes in the contour of surface 104 during the laying and compaction of fiber tow 14. Rolling contact of intermediate presser element disk 115 occurs with fiber tow 14 during the laying and compaction of fiber tow 14 by roller bearing 118 having elastic band 121 on its outer periphery and low friction film ring 122 on elastic band 121 engaging fiber tow 14.

Figure 6:
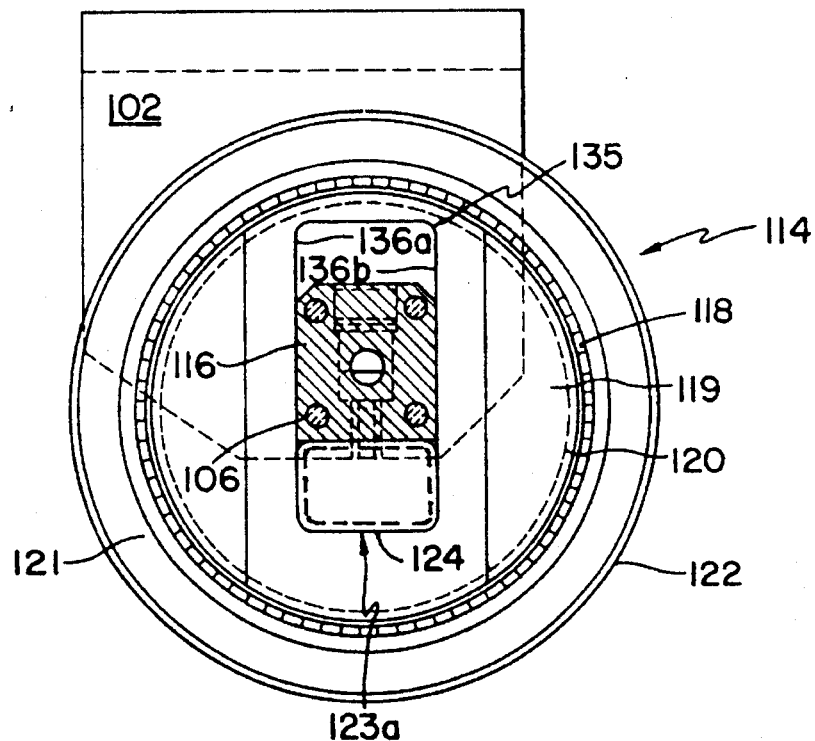
FIG. 6 is a view taken generally along line 6—6 of FIG. 3 of an end presser element of the presser member of this invention.

End presser element disk 114, shown in FIG. 6 in side elevation with partial section, taken along line 6—6 of FIG. 3, is mounted on the support block 116, for linear movement along a path parallel to center line W (FIG. 3) and perpendicular to the datum axis 131 (FIG. 3), through a substantially rectangular opening 135 formed by side guide surfaces 136*a,b* in core 119 of end presser element disk 114. The bladder spring 123*a* passes through the lower end of opening 135 so as to place elastic membrane 124 of bladder spring 123*a* in contact with core 119 of end presser element disk 114 whereby bladder spring 123*a*, upon being pressurized, can exert a force on end disk 114 in a direction toward mandrel 16 thereby causing end presser element disk 114 to apply a compaction force on fiber tow 14 on surface 104 of mandrel 16. Free space is provided at the upper end of opening 135 to allow linear movement of end disk 114 in response to changes in the contour of surface 104 of mandrel 16. A ball bearing 118, on the outer periphery of core 119 and resting against flange 120 of core 119, has an elastic band 121 carrying on its outer periphery a low friction film ring 122 which provides rolling contact between end presser element disk 114 and fiber tow 14 during the layup and compaction of tow 14.

Figure 7:
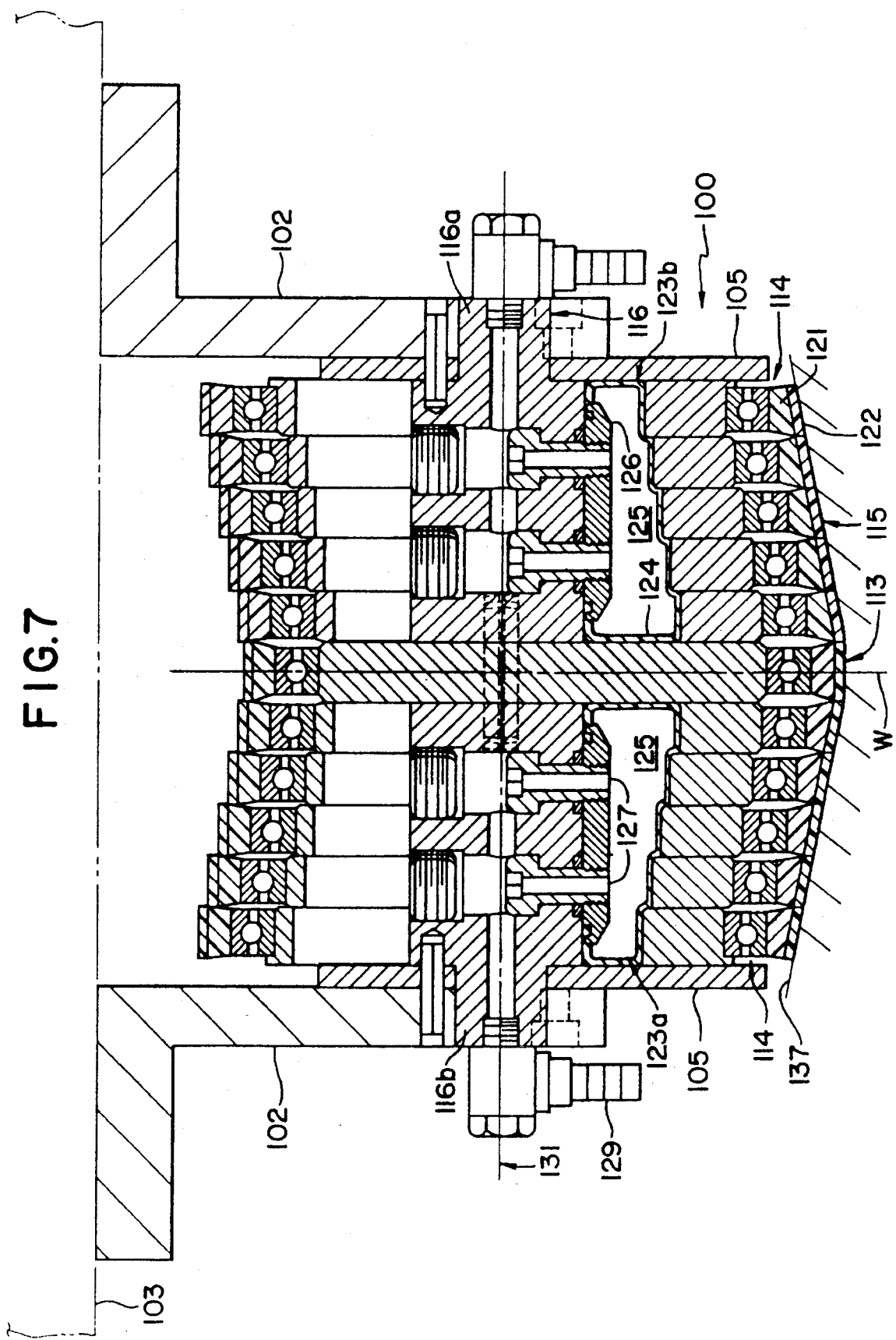
FIG. 7 is a view of the presser member of FIG. 3 with the presser elements displaced according to the contour of the work surface.

A change in the configuration of segmented presser member 100 with respect to the position of the presser element disks in response to a change in the contour of surface 104 of mandrel 16 from a flat contour shown in FIG. 3 to V groove or valley contour is depicted in FIG. 7 to demonstrate the distinction and advantage of this invention over the prior art. In the practice of this invention in accordance with segmented presser member 100 center presser element disk 113 is stationary with respect to linear movement along a path that is coincident with center line W and perpendicular to datum axis 131 and thus any adjustment of the spatial position of center disk 113 with a change in the contour of the surface 104 of mandrel 16 requires that the entire segmented presser member 100 move accordingly. Such movement was discussed earlier in conjunction with FIG. 2 for the movement of segmented presser member 100. In a situation where the center presser element disk 113 would move into a valley contour of surface 104 during layup and compaction of fiber tow 14, the linearly movable intermediate presser element disks 115 and end presser element disks 114 would move in response to that change in contour so that they would maintain contact with and constant compaction force against the walls of the valley as is shown in FIG. 7. To adjust to the change in contour of surface 104 so as to maintain such contact with and compaction force against the walls of the valley the elastic membrane 124 of bladder springs 123*a*,123*b* deforms with the movement of the disks in a direction and amount consistent with the linear movement of the movable presser element disks. Pressurized fluid in chamber 125 of bladder springs 123*a*,123*b*, pressing against elastic membrane 124 that, in turn, presses against intermediate disks 115 and end disks 114, and maintains these disks in contact with the walls of the valley under a constant compaction force.

As discussed earlier in connection with FIG. 2 compaction force or pressure is applied by the center presser element disk 113 to tow 14 on mandrel 16 by the fluid cylinder 107 moving the segmented presser member 100 into engagement with surface 104 of mandrel 16. To maintain the compaction force applied by the center disk 113, the pressure of the fluid in chamber 125 of bladder springs 123*a*,123*b* is adjusted to a value which would prevent disengaging center disk 113 from contact with surface 104 and/or reduce the compaction force being applied by center disk 113. Further the fluid pressure in chamber 125 of bladder springs 123*a* and 123*b* would be kept at a value to provide compaction force being applied by the intermediate disks 115 and end disks 114 equal to the compaction force being applied by center disk 113. This can be done by means for dumping pressurized fluid from or adding pressurized fluid to chamber 125. Such means for adjusting the pressure of the fluid in chamber 125 are well known in the art.

In accordance with this invention each elastic band 121 and associated low friction film ring 122 on each linearly movable disk (i.e., intermediate presser element disks 115 and end presser element disks 114) moves independently of adjacent elastic bands 121 and associated low friction film ring 122 on adjacent linearly movable disks. Thus the elastic bands 121 and associated low friction film rings 122 are not connected together between adjacent disks. This is shown by the configuration of the upper end of the disks 113,114,115 of segmented presser member 100 shown in FIG. 7. The independent movement of elastic bands 121 eliminates the spring or rubber band effect produced by a prior art continuous elastic sleeve or cover spanning adjacent linearly movable presser disks of a segmented presser member. Thus in accordance with this invention there is achieved a uniform compaction force applied, to the fiber tow, along the compaction line of contact between segmented presser member 100 and the fiber tows on the surface 104 of mandrel 16.

Figure 8:
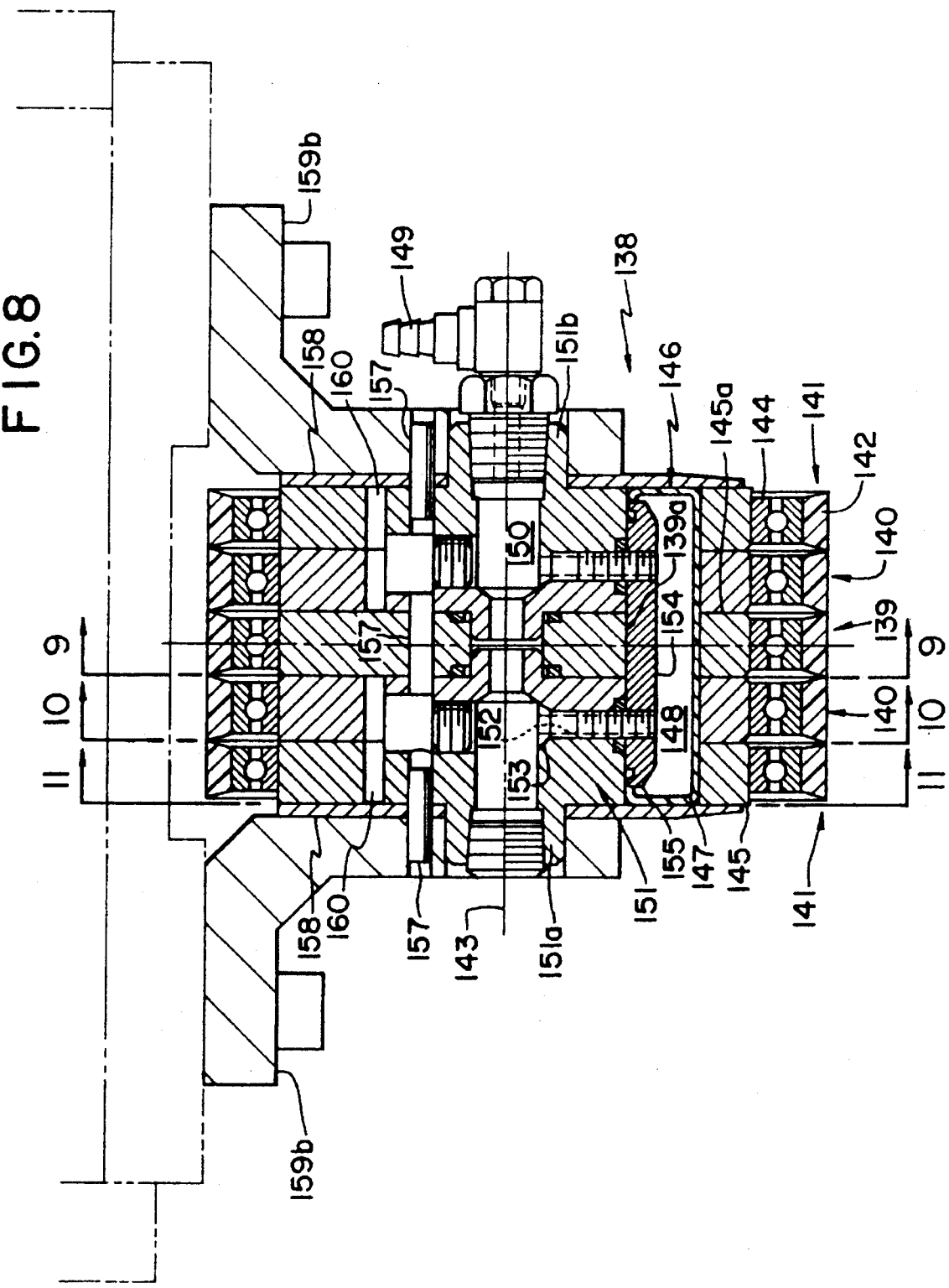
FIG. 8 is a view in partial section of an alternative embodiment of the presser member of this invention.

An alternative embodiment of a segmented presser member in accordance with this invention is shown in FIG. 8, in which there are fewer presser element disks than in the segmented presser member 100 of FIG. 3. In this alternative embodiment, the low friction film rings 122 of FIG. 3 are absent. The low friction film ring 122, that engages fiber tow 14 during laydown and compaction of the tow, is chosen so as to prevent sticking and/or high friction between the fiber tow engaging surface of the presser element disk and the fiber tow during the layup and compaction of the tow. Such prevention of sticking and/or high friction reduces or eliminates damage to the fiber tow, as well as poor tracking and misalignment of the tow on the surface of a mandrel or other work surface. Similar prevention of sticking and/or high friction between the fiber tow engaging face of a presser element (e.g., presser element disk) of a segmented presser member 138 in accordance with this invention can be achieved by having the elastic band 142 made of a material that has low friction and antisticking properties against the fiber tow. In FIG. 8, the segmented presser member 138 has a center presser element disk 139, with intermediate and end presser element disks 140, 141 at each side. Each of the presser element disks 139,140,141 has, on the outer periphery, an elastic band 142 of a resilient low friction material that provides the fiber tow engaging face of the disk for laying and compacting the tow. The center presser element disk 139 does not have linear radial movement with respect to its central datum axis 143, whereas the intermediate and end presser element disks 140,141 are free to move with independent linear motion perpendicular with respect to the central datum axis 143 with changes in the contour of the surface of a mandrel or other work surface during layup and compaction of the fiber tow.

Figure 11:
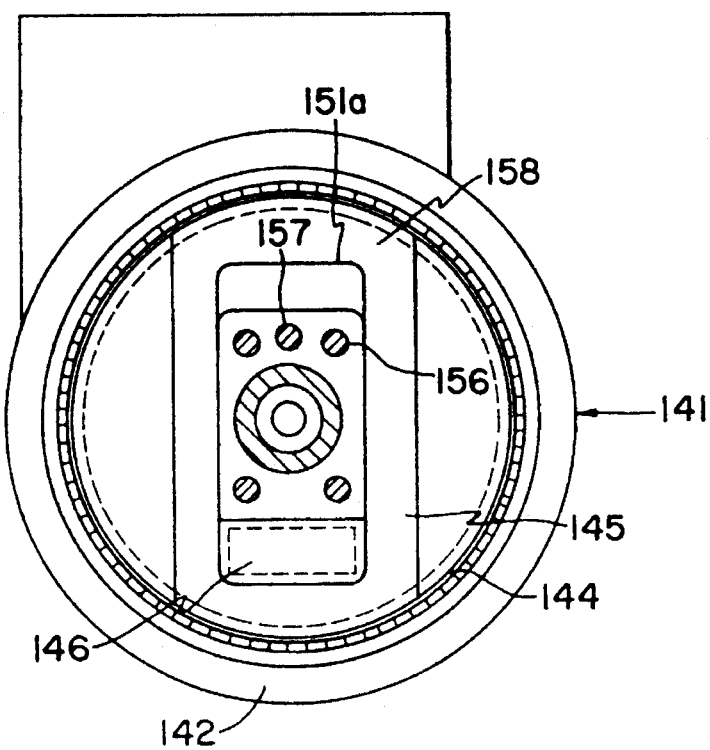
FIG. 11 is a view taken generally along line 11—11 of FIG. 8 of an end presser element of an alternative embodiment of the presser member of this invention.
Figure 9:
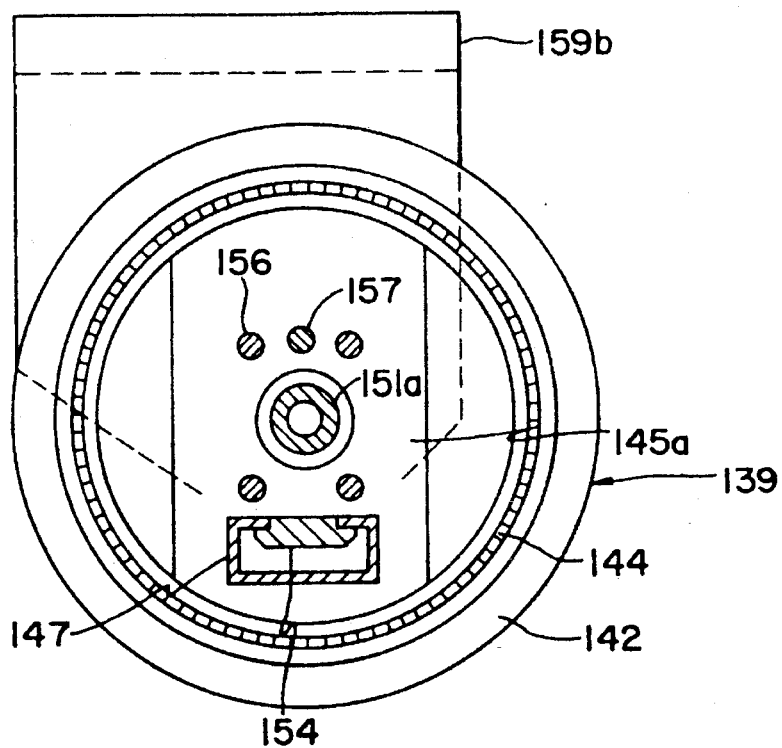
FIG. 9 is a view taken generally along line 9—9 of FIG. 8 of the center presser element of an alternative embodiment of the presser member of this invention.
Figure 10:
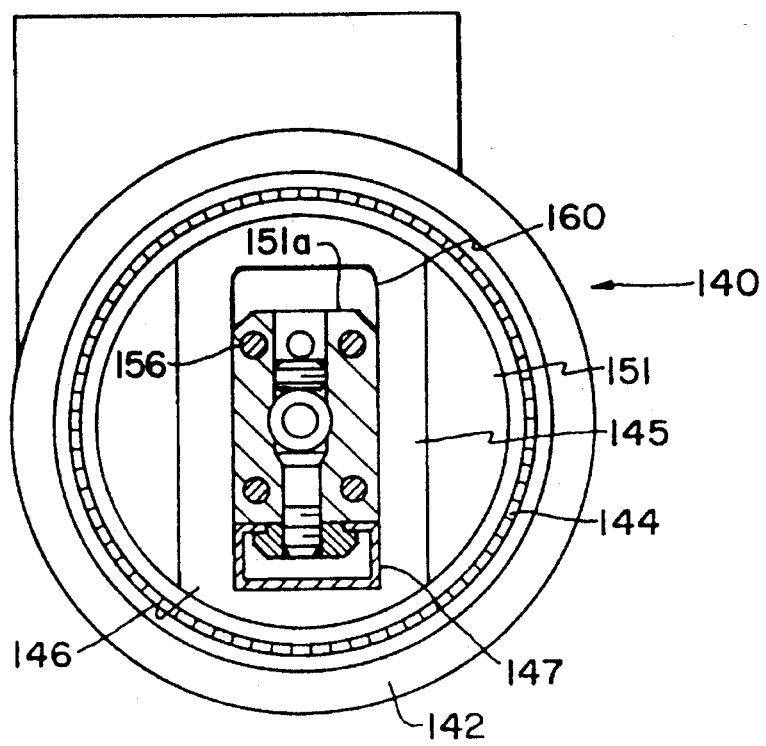
FIG. 10 is a view taken generally along line 10—10 of FIG. 8 of an intermediate presser element of an alternative embodiment of the presser member of this invention.

A ball bearing 144 is provided on the outer periphery of the core 145 of each of the movable presser element disks 140,141, and the core 145a of the center disk 139, to give rolling engagement of each disk with the fiber tows during layup and compaction of the tows. The segmented presser member 138 has a bladder spring 146, extending through all of the presser element disks 139,140,141, having a flexible membrane 147 forming a chamber 148 and engaging each of the disks of the segmented presser member 138. The membrane 147 extends through a small, close-fitting opening 139a in the center disk 139 in order to span all of the disks. Pressurized fluid (e.g., compressed air) is supplied to inlet 149, and flows through passageway 150 in block 151; the fluid enters chamber 148 through ports 152 extending through flat head screws 153 used to mount a membrane clamping plate 154 to block 151. The plate 154 has a lip 155 that engages and holds the flexible membrane 147 against the block 151 to keep the membrane 147 in place. Block 151 has two halves 151a and 151b, held together by screws 156 and a pin 157 (see FIG. 9), that capture the center disk 139 and hold it stationary, with respect to linear movement normal the central datum axis 143. The halves 151a,b are piloted into the core 145a of the center disk 139. The halves 151a are also fixed with the side plates 158 and mounting brackets 159a,b by pins 157. With reference also to FIGS. 10 and 11, block 151 passes through an opening 160 which runs through the movable presser element disks 140,141 to carry and guide the disks 140,141 for independent linear movement normal to the central datum axis 143. Pressurized fluid (e.g., compressed air) entering chamber 148 pressurizes bladder spring 146 causing flexible membrane 147 to apply a force (i.e., compaction force) on the movable presser element disks 140,141 that, in turn, apply the compaction force on fiber tows on the surface of a mandrel or other work surface (e.g., mold). As in the case in FIG. 3 the elastic bands 142 on adjacent presser element disks are separated from each other by a small gap that permits independent linear movement of the elastic bands 142, on adjacent disks, along with their associated presser element disks.

In a further embodiment of this invention the segmented presser member may comprise a plurality of parallel arrayed, side-by-side stacked nonrotatable presser elements that are free to move independently of each other along a linear path that is parallel to or coincident with an imaginary line passing through the center of the presser element and the area of contact between the presser member and the work surface (e.g., mold surface or surface of a mandrel), and wherein each presser element has an elastic band or elastic material layer thereon for laying and compacting fiber tow that moves independently of elastic bands on adjacent presser elements.

The practice of this invention has been described with respect to a segmented presser member having a center presser element that is stationary with respect to linear movement along a path parallel to or coincident with an imaginary line through the center of the presser element and passing through the area of contact between the presser element and the work surface (e.g., mold surface or surface of a mandrel). It is recognized that this invention includes and may be practiced with a segmented presser member wherein all presser elements are free to independently move linearly along a path parallel to or coincident with an imaginary line through the center of the presser element and passing through the area of contact between the presser element and the work surface. Thus, the segmented presser member in accordance with this invention may comprise a plurality of presser elements wherein at least one of the presser elements is independently, linearly movable as previously described herein. Preferably the segmented presser member in accordance with this invention comprises a plurality of presser elements that are independently, linearly movable as previously described therein.

The rotary motion of the presser elements in accordance with one practice of the segmented presser member of this invention may be achieved by various means well known in the art. One such means, namely an antifriction ball bearing, has been identified herein. In the embodiments of this invention described herein wherein an antifriction bearing is employed to produce rotary movement to the presser element (e.g., presser element disk) the bearing may be attached by a press fit onto the presser element. Various other methods, well known in the art, may be used to attach means for producing rotary motion to the presser element.

In the practice of this invention the elastic band or elastic material layer may be adhesively attached to the presser element or may be attached to the presser element by other methods well known in the art which permit the deformation and recovery from deformation of the elastic band during layup and compaction of the fiber tows. The low-friction film may be attached to the elastic band with adhesive or other suitable means.

Presser elements of the segmented presser member in accordance with this invention may be made of suitable rigid materials well known in the art, including but not limited to rigid plastic and metals such as steel and aluminum. The terms presser element and presser segment are interchangeably used herein and shall have the same meaning in respect to this description and the appended claims.

Those skilled in the art will appreciate that the segmented presser may be used with other machines and processes; for example, composite tape laying machines, and processes for making structures from composite tape.

This invention has been described herein with respect to the preferred and other embodiments and it is not intended that this invention be limited by such description; rather, those skilled in the art will recognize from this disclosure other embodiments as come within the scope of the appended claims.

What is claimed is:

1. An improved fiber tow laying and compacting device for making a composite fiber article comprising:

a. a housing for carrying a segmented presser member and
   b. a segmented presser member for laying and compacting fiber tows comprising a plurality of independently, linearly movable individual presser elements in a stacked side-by-side parallel array supported in the housing, each presser element comprising an outer periphery extendible from the housing toward a workpiece surface and an elastic material layer on said periphery independent of adjacent elastic material layers on adjacent periphery of adjacent presser elements of the segmented presser member, said linearly movable individual presser elements movable along an axis extending through the center of the presser element and intersecting the area of contact between the presser element and the workpiece surface and wherein the presser element further comprises a means for providing rotary motion to the element and wherein the arrayed presser elements of said presser member cooperatively function to substantially exclude penetration of the fibers of the fiber tow between the presser elements during laying and compacting of the fiber tows.

2. The fiber tow laying and compacting device according to claim 1 wherein the elastic material layer has a periphery comprising a low friction material.

3. The fiber tow laying and compacting device of claim 1 further comprising a bladder spring means.

4. A fiber tow laying and compacting device according to claim 1 wherein the elastic material layer is an elastomeric polyurethane.

5. The fiber tow laying and compacting device according to claim 1 wherein the segmented presser member has at least one presser element that is stationary relative to the adjacent independently linearly movable presser elements in respect to linear movement along an axis extending through the center of the presser element and intersecting the area of contact between the presser element and the workpiece surface.

6. The fiber tow laying and compacting device according to claim 5 wherein the elastic material layer has a periphery comprising a low friction material.

7. A fiber tow laying and compacting device according to claim 5 further comprising a bladder spring.

8. The fiber tow laying and compacting device according to claim 1 wherein the segmented presser member has one presser element that is stationary relative to the adjacent independently linearly movable presser elements in respect to linear movement along an axis extending through the center of the presser element and intersecting the area of contact between the presser element and the workpiece and the elastic material layer has a periphery comprising a low friction layer.

9. A fiber tow laying and compacting device according to claim 8 further comprising a bladder spring means.

10. The device according to claim 8 wherein the elastic material layer is an elastic polyurethane.

11. The device according to claim 10 wherein the low friction material is (TEFLON).

12. An improved fiber tow laying and compacting device for making a composite fiber article comprising:

a. a housing for carrying a segmented presser member and
b. a segmented presser member for laying and compacting fiber tows comprising a plurality of individual presser elements in a stacked side-by-side parallel array supported in the housing, each presser element comprising an outer periphery extendible from the housing toward a workpiece surface and an elastic material layer on said periphery independent of adjacent elastic material layers on adjacent periphery of adjacent presser elements of the segmented presser member at least one of the individual presser elements being independently linearly movable along an axis extending through the center of the presser element and intersecting the area of contact between the presser element and the workpiece surface and wherein the segmented presser member has at least one presser element that is stationary relative to the adjacent independently, linearly movable presser elements in respect to linear movement along an axis extending through the center of the presser element and intersecting the area of contact between the presser element and the workpiece surface and wherein the arrayed presser elements of said presser member cooperatively function to substantially exclude penetration of the fibers of the fiber tow between the presser elements during laying and compacting the fiber tows.

13. A fiber tow laying and compacting device according to claim 12 wherein the elastic material layer has a periphery comprising a low friction material.

14. The fiber tow laying and compacting device of claim 13 wherein the low friction material is (TEFLON).

15. The fiber tow laying and compacting device according to claim 14 wherein the elastic material layer is an elastomeric polyurethane layer.

16. A fiber tow laying and compacting device according to claim 12 wherein the segmented presser member has one presser element that is stationary relative to the adjacent independently linearly movable presser elements in respect to movement along an axis extending through the center of said presser element and intersecting the area of contact between said presser element and the workpiece surface and the elastic material layer has a periphery comprising a low friction material.

17. The fiber tow laying and compacting device of claim 16 wherein the elastic material layer is an elastomeric polyurethane layer.

18. The fiber tow laying and compacting device of claim 17 wherein the low friction material is (TEFLON).

19. A fiber tow laying and compacting device according to claim 16 further comprising a bladder spring means.

20. The fiber tow laying and compacting device according to claim 12 further comprising a bladder spring means.

21. In a method for laying and compacting fiber tows onto a workpiece surface to produce a composite fiber article the steps comprising:

a. providing fiber tows to a fiber tow laying and compacting device comprising:
  i) a housing for carrying a segmented presser member and
  ii) a segmented presser member for laying and compacting fiber tows comprising a plurality of independently, linearly movable individual presser elements in a stacked side-by-side parallel array supported in the housing, each presser element comprising an outer periphery extendible from the housing toward a workpiece surface and an elastic material layer on said periphery independent of adjacent elastic material layers on adjacent periphery of adjacent presser elements of the segmented presser member, said linearly movable individual presser elements movable along an axis extending through the center of the presser element and intersecting the area of contact between the presser element and the workpiece surface and wherein the presser element further comprises a means for providing rotary motion to the element, and wherein the arrayed presser elements of said presser member cooperatively function to substantially exclude penetration of the fibers of the fiber tow between the presser elements during laying and compacting of the fiber tows;

b. supplying fiber tows to presser elements of said presser member and c. laying and compacting the fiber tows onto the workpiece surface by presser elements of said presser member while substantially excluding fiber penetration between presser elements of said presser member.

22. The method according to claim 21 wherein the step of providing fiber tows to a fiber tow laying and compacting device is a step of providing fiber tows to the fiber tow laying and compacting device according to claim 21 wherein the segmented presser member has at least one presser element that is stationary relative to the adjacent independently, linearly movable presser elements in respect to movement along an axis extending through the center of said presser element and intersecting the area of contact between said presser element and the workpiece surface, has a bladder spring and the elastic material layer has a periphery comprising a low friction material.

23. In a method for laying and compacting fiber tows onto a workpiece surface to produce a composite fiber article the steps comprising:
   a. providing fiber tows to a fiber laying and compacting device comprising:
      i. a housing for carrying a segmented presser member and
      ii. a segmented presser member for laying and compacting fiber tows comprising a plurality of individual presser elements in a stacked side-by-side parallel array supported in the housing, each presser element comprising an outer periphery extendible from the housing toward a workpiece surface and an elastic material layer on said periphery independent of adjacent elastic material layers on adjacent periphery of adjacent presser elements of the segmented presser member at least one of the individual presser elements being independently, linearly movable along an axis extending through the center of the presser element and intersecting the area of contact between the presser element and the workpiece surface and wherein the segmented presser member has at least one presser element that is stationary relative to the adjacent independently, linearly movable presser elements in respect to linear movement along an axis extending through the center of the presser element and intersecting the area of contact between the presser element and the workpiece surface and wherein the arrayed presser elements of said presser member cooperatively function to substantially exclude penetration of the fibers of the fiber tow between the presser elements during laying and compacting the fiber tows;
   b. supplying fiber tows to presser elements of said presser member and
   c. laying and compacting the fiber tows onto the workpiece surface by presser element of said presser member while substantially excluding fiber penetration between presser elements of said presser member.

24. The method according to claim 23 wherein the step of providing fiber tows to a fiber tow laying and compacting device is a step of providing fiber tows to the fiber tow laying and compacting device according to claim 23 wherein the segmented presser member has a bladder spring and the elastic material layer has a periphery comprising a low friction material.

* * * * *